United States Patent
Kim et al.

(10) Patent No.: US 9,491,799 B2
(45) Date of Patent: Nov. 8, 2016

(54) SMALL BASE STATION FOR MOBILE COMMUNICATION SYSTEM

(71) Applicant: KMW Inc., Hwaseong, Gyeonggi-do (KR)

(72) Inventors: Duk Yong Kim, Gyeonggi-Do (KR); Young-Chan Moon, Gyeonggi-Do (KR); Myong-Sik Lee, Gyeonggi-Do (KR); Chang-Woo Yoo, Gyeonggi-Do (KR); Min-Sik Park, Gyeonggi-Do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 0 days.

(21) Appl. No.: 14/615,087

(22) Filed: Feb. 5, 2015

(65) Prior Publication Data

US 2015/0156818 A1 Jun. 4, 2015

Related U.S. Application Data

(63) Continuation of application No. PCT/KR2013/007063, filed on Aug. 6, 2013.

(30) Foreign Application Priority Data

Aug. 7, 2012 (KR) .................. 10-2012-0086155
Sep. 27, 2012 (KR) .................. 10-2012-0108217

(51) Int. Cl.
*H04M 1/00* (2006.01)
*H04W 88/08* (2009.01)
(Continued)

(52) U.S. Cl.
CPC ............. *H04W 88/08* (2013.01); *H01Q 1/02* (2013.01); *H01Q 1/246* (2013.01); *H01Q 15/14* (2013.01); *H01Q 21/26* (2013.01); *H04Q 1/025* (2013.01)

(58) Field of Classification Search
CPC ....... H04W 88/08; H04Q 1/025; H04Q 1/02; H04Q 1/246; H04Q 15/14; H04Q 21/26
USPC ............................................. 455/561, 562.1
See application file for complete search history.

(56) References Cited

U.S. PATENT DOCUMENTS

| 5,285,348 A | 2/1994 | Kashima et al. |
| 7,952,868 B2 * | 5/2011 | Chen ............ G06F 1/187 345/170 |

(Continued)

FOREIGN PATENT DOCUMENTS

| EP | 2 389 719 A1 | 11/2011 |
| EP | 2 408 121 | 1/2012 |

(Continued)

OTHER PUBLICATIONS

Notice of Allowance for Japanese Patent Application No. 2015-523025 dated Jun. 13, 2016.

*Primary Examiner* — Khai M Nguyen
(74) *Attorney, Agent, or Firm* — Mintz Levin Cohn Ferris Glovsky and Popeo, P.C.; Kongsik Kim; Jonathon Western (57) ABSTRACT

The present invention discloses a base station, the size of which is reduced and which is to be adopted in a mobile communication system. The disclosed small base station includes: a polyhedral housing; an antenna unit disposed on the widest surface of the outer surface of the housing; a first board arranged on any outer surface of the housing; and two or more boards which are arranged in an upright state with the first board and which are arranged to face three or more outer side surfaces of the housing, respectively.

13 Claims, 6 Drawing Sheets

(51) Int. Cl.
*H04Q 1/02* (2006.01)
*H01Q 1/24* (2006.01)
*H01Q 15/14* (2006.01)
*H01Q 1/02* (2006.01)
*H01Q 21/26* (2006.01)

(56) References Cited

U.S. PATENT DOCUMENTS

| | | | |
|---|---|---|---|
| 8,497,813 B2 * | 7/2013 | Rodger | H01Q 1/02 343/702 |
| 2005/0024276 A1 * | 2/2005 | Izumi | H01Q 1/1264 343/702 |
| 2008/0130259 A1 * | 6/2008 | Hederoth | H05K 9/0015 361/816 |
| 2009/0237883 A1 * | 9/2009 | Wei | G06F 1/20 361/699 |
| 2011/0032158 A1 | 2/2011 | Rodger et al. | |
| 2012/0014697 A1 | 1/2012 | Zhao et al. | |

FOREIGN PATENT DOCUMENTS

| | | | |
|---|---|---|---|
| EP | 2485563 A2 | | 8/2012 |
| GB | 2 298 995 | | 9/1996 |
| JP | 64-024636 | | 1/1989 |
| JP | 2782213 B2 | | 7/1998 |
| JP | 2004-235840 | | 8/2004 |
| JP | 2008244185 A | * | 10/2008 |
| JP | 2009-027539 A | | 2/2009 |
| JP | H04-113724 | | 4/2015 |
| KR | 10-2005-0088753 A | | 9/2005 |
| KR | 10-2011-0035577 A | | 4/2011 |
| WO | 2009-133112 A1 | | 11/2009 |

* cited by examiner

SMALL BASE STATION FOR MOBILE COMMUNICATION SYSTEM

CROSS REFERENCE TO RELATED APPLICATIONS

This application is a continuation of International Application No. PCT/KR2013/007063 filed on Aug. 6, 2013, which claims priority to Korean Application No. 10-2012-0086155 filed on Aug. 7, 2012 and Korean Application No. 10-2012-0108217 filed on Sep. 27, 2012, which applications are incorporated herein by reference.

TECHNICAL FIELD

The present invention relates to a base station of a mobile communication system, and more particularly to a small base station installed in a building or a house.

BACKGROUND ART

A base station of a mobile communication system refers to a system for relaying electric waves of a portable terminal in a cell. The base station is generally installed on a roof of a building to relay electric waves of a portable terminal. Accordingly, base stations are present in units of cells, and the base stations controls transmission of signals, designation of a communication channel, and monitoring of a communication channel in units of cells, as well as an interface function between the portable terminal and a switch center.

The antennas employed in the base station are distributed due to presence of many control antennas which may be vertically or horizontally beam-tilted.

In addition, a small base station for improving communication quality while reducing frequency load is installed as a system for covering an area which is still smaller than the radius of the current existing mobile communication service. The base station is used to accommodate data traffic intensively generated in a small area. As a small base station can be installed in a building or a house, a shading area can be solved and a higher network and a convergence service can be realized.

However, because the small base station employed in the existing mobile communication system is configured such that main components mounted to the interior of the base station, for example, a main board, a power supply unit, an antenna, and a power amplifier are vertically stacked, there is a limit in reducing the entire size of the base station.

In particular, because the small base station according to the related art is configured such that a main board, a power supply unit and the like are installed on one board, the overall size of the main board become larger and heat emission of the power amplifier becomes problematic.

SUMMARY

Accordingly, the present invention provides a small base station of a mobile communication system which can advantageously realize a small size by three-dimensionally disposing main elements at proper places with respect to a box.

The present invention also provides a small base station of a mobile communication system which can minimize a heat emission problem by disposing a plurality of power amplifiers such that they are spaced apart from each other by the farthest distance.

In accordance with an aspect of the present invention, there is provided a base station of a mobile communication system, including: a polyhedral box; an antenna unit installed on the widest one of outer surfaces of the box; a first board disposed on one of the outer surfaces of the box; and at least two boards disposed in an upright position from the first board, and disposed to face at least three outer surfaces of the box.

The box includes: first and second outer surfaces which face each other; and third and fourth outer surfaces disposed between the first and second outer surfaces while facing each other. At least three inner walls are provided inside a surface of the box on which the antenna is installed.

The board includes: second and third boards disposed in parallel to the first and second outer surfaces to face the first and second outer surfaces, respectively; and a fourth board disposed in parallel to the third outer surface while facing the third outer surface.

The first board is a digital interface module, the second and third boards are first and second power amplifiers, and the fourth board is an up/down converter.

The power supply unit is disposed on the fourth outer surface, and is disposed to be perpendicular to the first board.

The antenna unit includes an antenna and an antenna transmission/reception module stacked on the antenna.

The inner wall acts as a reflective plate of the antenna unit.

The box is a filter unit.

The filter unit has at least two filters coupled to face each other.

The first to fourth boards and the power supply unit are disposed to surround all the outer surfaces of the box.

As described above, the digital interface module and the antenna unit are stacked in the Z axis direction, but the first and second power amplifiers, the up/down converter, and the power supply unit are disposed along the X and Y axes such that the base station can be made small. In particular, according to the present invention, a plurality of boards are not vertically stacked but are three-dimensionally disposed along the outer surfaces of the box in consideration of heat emission, so that the boards can be efficiently mounted in a limited space.

DETAILED DESCRIPTION

The present invention includes: a polyhedral box; an antenna unit installed on the widest one of outer surfaces of the box; a first board disposed on any one of the outer surfaces of the box; and a least two boards disposed in an upright position from the first board, and disposed to face at least three outer surfaces of the box.

Hereinafter, the present invention will be described with reference to the accompanying drawings. The same reference numerals denote the same elements.

Figure 1:
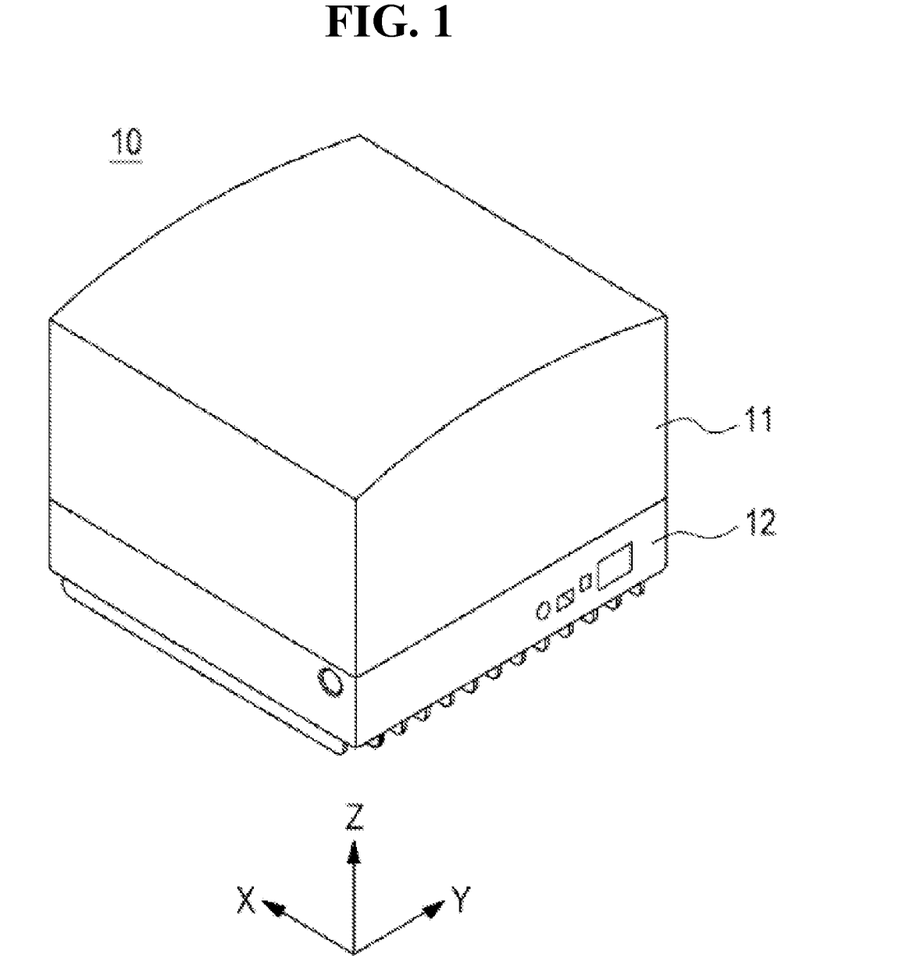
FIG. 1 is a perspective view showing an external appearance of a small base station according to the present invention.
Figure 2:
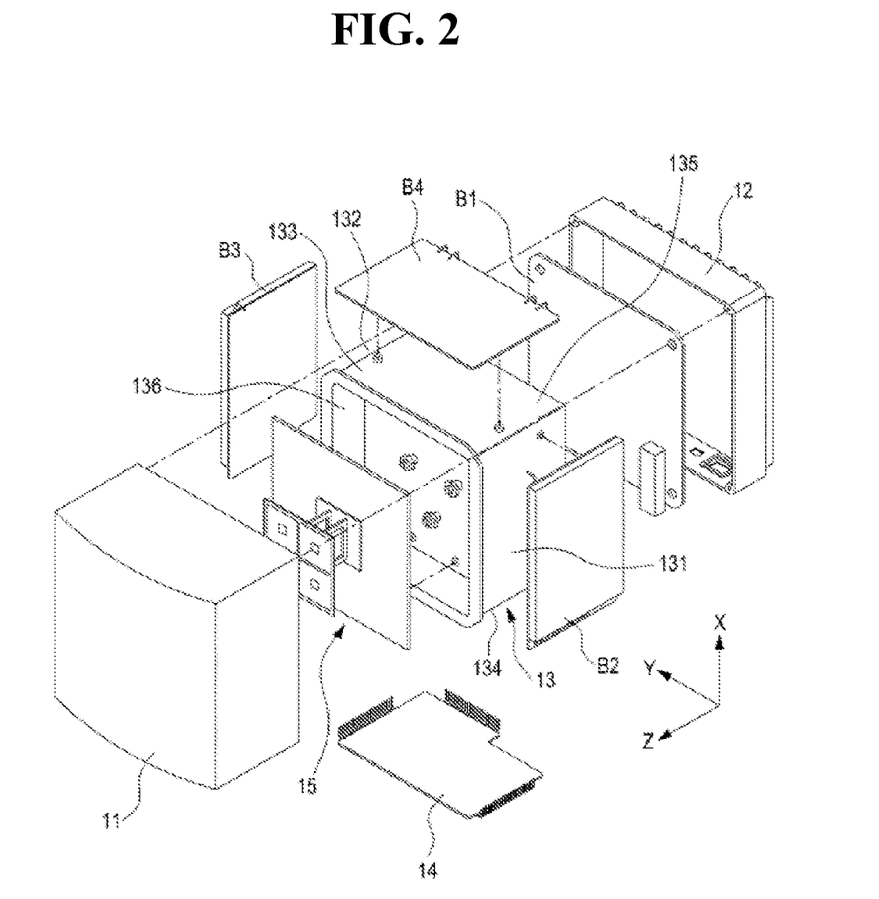
FIG. 2 is an exploded perspective view showing a configuration of the small base station according to the present invention.

In the description of the small base station according to the present invention, the Cartesian coordinate system shown in FIGS. 1 and 2 is used, in which the X axis denotes a transverse direction, the Y axis denotes a longitudinal direction, and the Z axis denotes a perpendicular direction. The base station 10 according to the present invention is small-sized in a transverse direction, a longitudinal direction, and a perpendicular direction thereof as compared with the related art, but maintains a performance of an existing base station despite the small size. That is, the small size means that the entire size of the base station is small long the three axes as compared with the related art.

FIG. 1 shows an external appearance of the small base station 10 (hereinafter, simply referred to as a base station) according to the present invention. FIG. 1 shows an assembled state of the base station 10, and shows an external appearance of the base station 10 in which an outer cover 11 and a heat sink 12 are coupled to each other. The heat sink 12 is disposed on the bottom of the base station to support main elements mounted on the heat sink 12, and the outer cover 11 is coupled to the heat sink in the Z axis direction to protect main internal elements.

FIG. 2 is an exploded perspective view showing a configuration of the base station 10 according to the present invention. As shown in FIG. 2, an antenna unit 15, at least three boards B1 to B4 (printed circuit boards), a power supply unit (PSU) 14, and a heat sink 12, including a box 13, are three-dimensionally disposed at proper locations of the base station 10. The three-dimensional disposition of the plurality of boards does mean that the boards are not stacked along one axis but the main elements are disposed in consideration of the three axes including the X, Y, and Z axes, and in particular means that a plurality of boards are disposed in a reference board in an upright position along the X and Y axes and the remaining main elements are disposed along the Z axis, which three-dimensional disposition is advantageous in the small-size of the base station. In addition, the base station 10 according to the present invention considers a heat emission problem as well as the three-dimensional disposition of the main elements.

Figure 3:
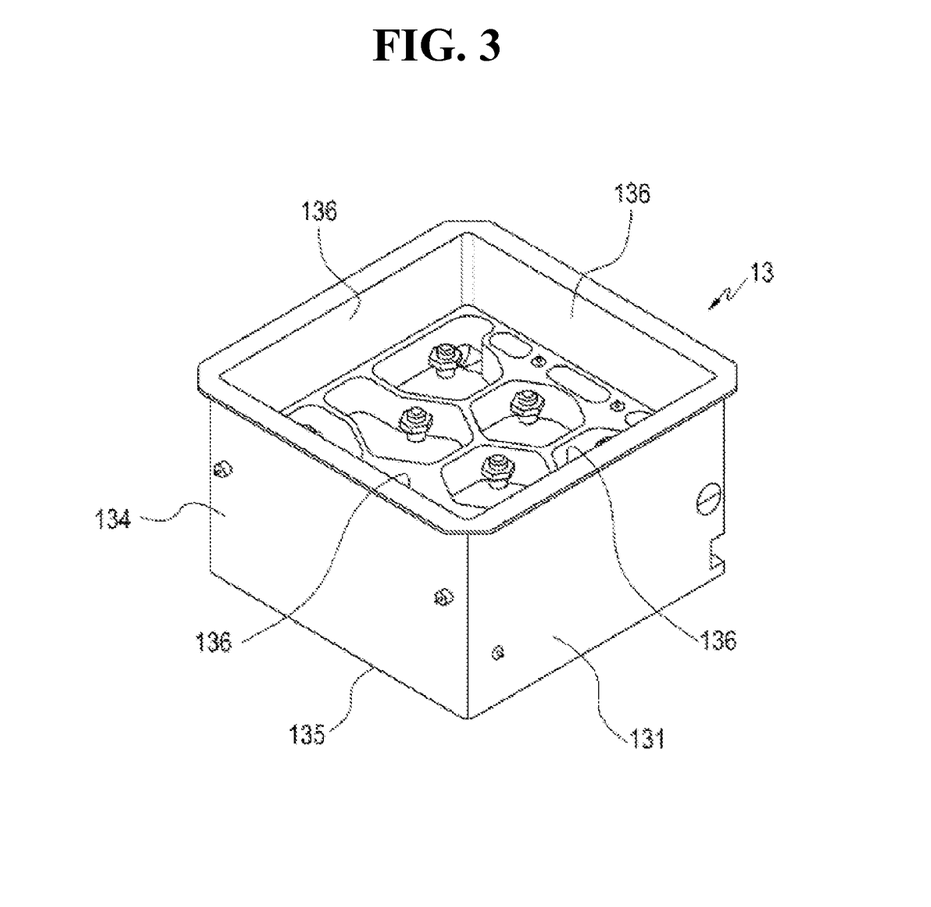
FIG. 3 is a perspective view showing a box to which an antenna unit of the small base station according to the present invention is mounted, and is a view showing a state in which an antenna is removed from the antenna unit.

The box 13 has a polyhedral shape, for example, a rectangular parallelepiped shape, and includes a plurality of outer surfaces and a plurality of inner walls and the antenna unit 15 is accommodated in the interior space. In particular, the box 13 has an open-topped box shape, and has at least three inner walls 136, at least three outer surfaces 131 to 134, and a bottom surface 135. The outer surfaces of the box include at least three outer surfaces 131 to 134, and a bottom surface 135. The inner walls include at least three inner walls. FIGS. 2 and 3 show four inner walls 136, and four outer surfaces 131 to 134. The outer surfaces and the inner walls have the same shapes and the same sizes.

The plurality of outer surfaces include first and second outer surfaces 131 and 132 facing each other, and third and fourth outer surfaces 133 and 134 disposed between the first and second outer surfaces 131 and 132 while facing the first and second outer surfaces 131 and 132, respectively. The first and second outer surfaces 131 and 132 are parallel to each other, and the third and fourth outer surfaces 133 and 134 are parallel to each other. The first outer surfaces 131 is perpendicular to the third and fourth surfaces 133 and 134, and the second outer surface 132 is perpendicular to the third and fourth surfaces 133 and 134. In addition, the first to fourth outer surfaces 131 to 134 are flat. Because the box has a rectangular parallelepiped shape, the first to fourth outer surfaces 131 to 134 have a rectangular shape.

The box 13 has a plurality of outer surfaces, in which in the aspect of the shapes of the outer surfaces, the first outer surface 131 and the second outer surface 132 may have the same rectangular or square shape, the third outer surface 133 and the fourth outer surface 134 may have the same rectangular or square shape, and the bottom surface 135 also may have a rectangular or square shape.

In the aspect of the sizes (areas) of the outer surfaces of the box, the first and second outer surfaces 131 and 132 and the third and fourth outer surfaces 133 and 134 of the box may have a rectangular shape of the same size, may have rectangular shapes of different sizes, or may have a square shape of the same size.

The bottom surface 135 of the outer surfaces, which is located at the bottom of the box, may have a rectangular or square shape, or may have a shape larger than, smaller than, or the same as those of the first and second outer surfaces 131 and 132 and the third and fourth outer surfaces 133 and 134. It is preferable that the box 13 according to the present invention has a bottom surface 135 which is wider than the first and second outer surfaces 131 and 132 and the third and fourth outer surfaces 133 and 134. FIG. 2 shows that the box 2 has a bottom surface 135 which is wider than the first and second outer surfaces 131 and 132 and the third and fourth outer surfaces 133 and 134. It is preferable that the bottom surface 135 has the widest area such that the antenna unit 15 is disposed on the bottom surface 135.

In detail, the disposition of the boards mounted to the outer surfaces of the box 13 will be described.

A plurality of boards B1 to B4, and the power supply unit 14 are disposed on the outer surfaces of the box 13. The plurality of boards includes first and fourth boards B1 to B4. The first board B1 is disposed on the bottom surface 135 of the box 13. The second and third boards B2 and B3 are disposed on the first and second outer surfaces 131 and 132 of the box 13. The fourth board B4 is disposed on the third outer surface 133. The power supply unit 14 is disposed on the fourth outer surface 134.

The first board B1 is a digital interface module, and is disposed in parallel to the bottom surface of the box 135 while facing the bottom surface of the box 135. The second board B2 is a first power amplifier PAM, and is disposed in parallel to the first outer surface 131 while facing the first outer surface 131. The third board B3 is a second power amplifier PAM, and is disposed in parallel to the second outer surface 132 while facing the second outer surface 132. The fourth board B4 is an up/down converter, and is disposed in parallel to the third outer surface 133 while facing the third outer surface 133. The power supply unit 14 is disposed in parallel to the fourth outer surface 134 while facing the fourth outer surface 134.

As mentioned above, the first to fourth boards B1 to B4, and the power supply unit 14 substantially have plate shapes, and may be disposed on the outer surface of the box, in detail, the first to fourth outer surfaces 131 to 134 and the bottom surface 135 are flat so as to have apertures or to be adhered to each other. The first and second power amplifiers B2 and B3 are disposed in parallel to each other while facing each other. The up/down converter B4 and the power supply unit 14 are disposed in parallel to each other while being spaced apart from each other.

The first and second power amplifiers B2 and B3 are disposed to be spaced apart from each other with respect to the box 13, in consideration of heat emission efficiency. That is, the first and second power amplifiers B2 and B3 have power amplifying elements (not shown), in consideration of a heat emission problem. That is, when a plurality of power amplifiers B2 and B3 are provided, it is most effective in heat emission to dispose the power amplifiers B2 and B3 such that they are spaced apart from each other at the longest distance possible. It is preferable to dispose the power amplifiers such that they face each other when the box 13 has a rectangular parallelepiped shape as shown in the drawings, and it is most preferable that the power amplifiers are separated by the largest distance possible when the box 13 has various shapes.

It will be appreciated by those skilled in the art that the power amplifiers may be disposed in two boards rather than in one board in consideration of the heat emission problem.

Although it has been exemplified that the first and second power amplifiers B2 and B3 are disposed on the first and second outer surfaces 131 and 132, they may be disposed on the third and fourth outer surfaces 133 and 134. The up/down converter B4 and the power supply unit 14 are disposed on the third and fourth outer surfaces 133 and 134, and may be disposed on the first and second outer surfaces 131 and 132 when the first and second power amplifiers B2 and B3 are disposed on the third and fourth outer surfaces 133 and 134. The up/down converter B4 and the power supply unit 14 face each other while being spaced apart from each other. The first power amplifier B2 is perpendicular to the digital interface module B1, the up/down converter B4, and the power supply unit 14, and the second power amplifier B3 is perpendicular to the digital interface module B1, the up/down converter B4, and the power supply unit 14.

In the disposition of the plurality of boards of the base station, the second to fourth boards are disposed in upright positions along a peripheral circumference of the first board.

Referring to FIGS. 3 to 6, the antenna unit 15 is disposed in the interior of the box 13. The antenna unit 15 includes an antenna 150, an antenna transmission/reception module, a reflective plate 151, a ground plate 152, and a plurality of radiation elements 153. The ground plate 152 and the radiation elements 153 are electrically connected to each other to transmit a radiation signal. A plurality of radiation elements 153 is provided to have radiation patterns, respectively. The radiation patterns may be realized by a tetragonal shape, a circular shape, a tetragonal ring shape, and the like.

Figure 4:
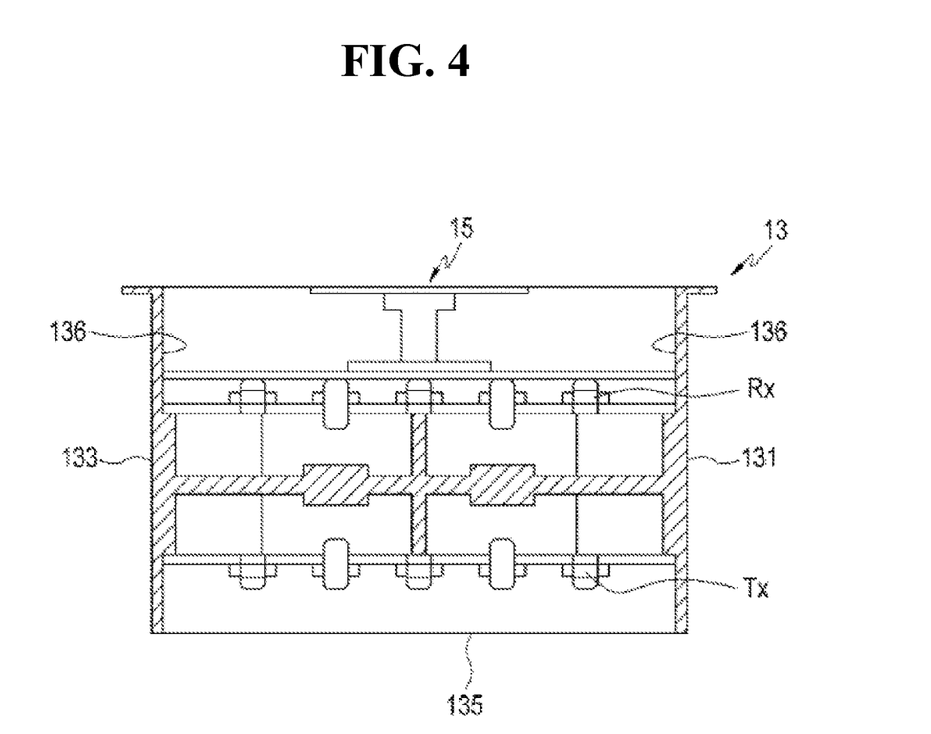
FIG. 4 is a sectional view showing the box to which the antenna unit of the small base station according to the present invention is mounted.
Figure 5:
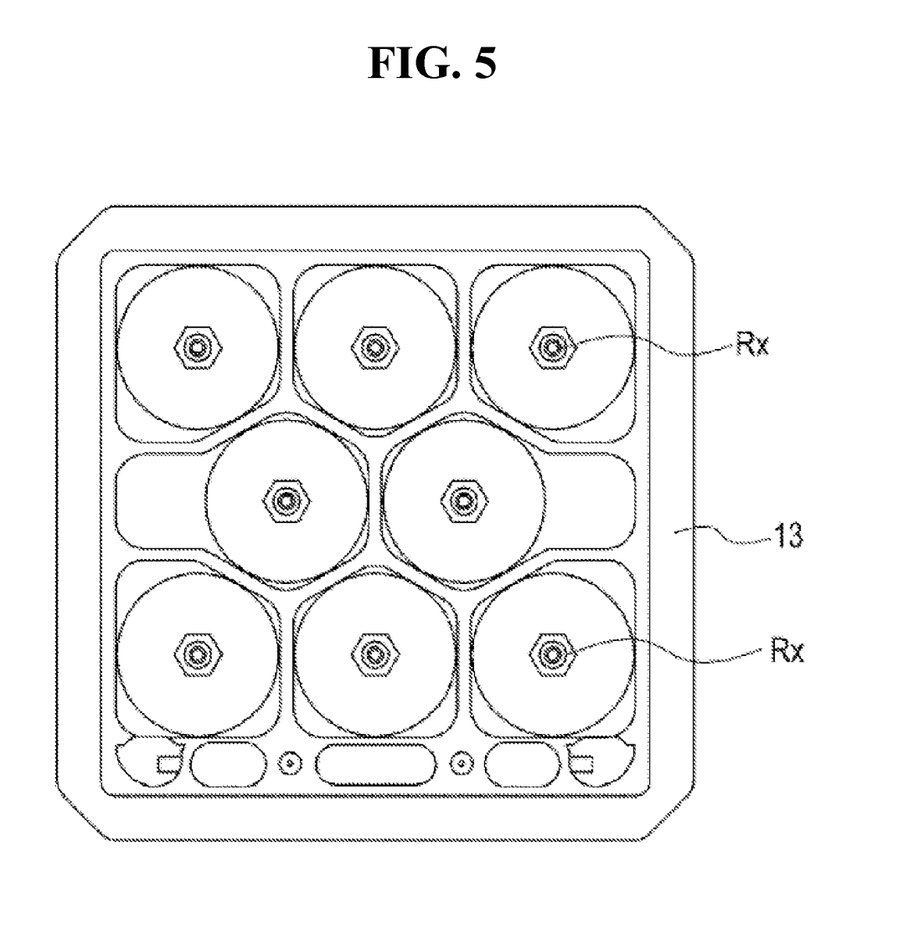
FIG. 5 is a plan view showing the box to which the antenna unit of the small base station according to the present invention is mounted, and is a view showing a state in which the antenna is removed from the antenna unit.
Figure 6:
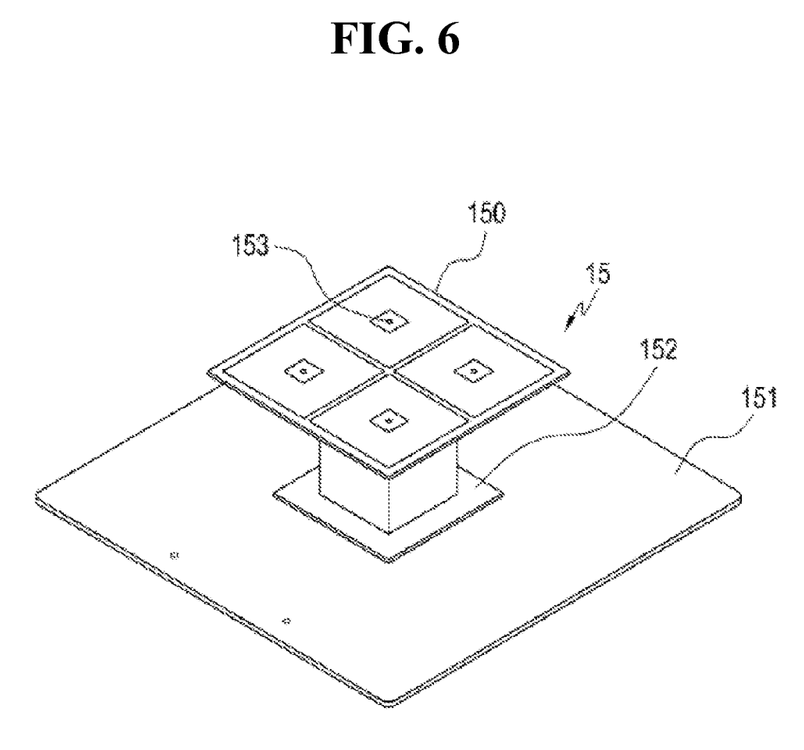
FIG. 6 is a perspective view showing the antenna of the small base station according to the present invention.

As shown in FIG. 4, if the antenna unit 15 is disposed in the interior of the box 13, the four inner walls 136 of the box act as reflective plates of the antenna.

The box 13 corresponds to a filter unit of the base station apparatus, and although it is exemplified in the embodiment that the filter has a cavity of a rectangular parallelepiped shape, the present invention is not limited thereto. The filter unit has at least two filters coupled to face each other.

When the box 13 has a rectangular parallelepiped shape, it is preferable that the antenna unit 15 is disposed on the widest of the six outer surfaces. That is, the reflective plate 151 of the antenna unit 15 becomes more helpful in improving RF characteristics as the areas of the reflective plate 151 become wider, and thus it is preferable that the reflective plate 151 is installed on the widest surface as shown in the drawings.

In the description of the disposition state of the main internal elements of the base station according to the present invention, electrical connections or a connection structure between the main internal elements are omitted. The electrical connections may be, for example, cables, and the connection structure may be, for example, a connector or a connection terminal.

According to the present invention, the digital interface module and the antenna unit are stacked in the Z axis direction, but the first and second power amplifiers, the up/down converter, and the power supply unit are disposed along the X and Y axes such that the base station can be made small. In particular, according to the present invention, a plurality of boards are not vertically stacked but are three-dimensionally disposed along the outer surfaces of the box in consideration of heat emission, so that the boards can be efficiently mounted in a limited space.

The invention claimed is:

1. A base station of a mobile communication system, comprising:
   a polyhedral box;
   an antenna unit installed on the widest of outer surfaces of the box and accommodated in an interior space of the box which is formed inside of the widest of outer surfaces of the box;
   a first board disposed on one of the outer surfaces of the box; and
   at least two other boards disposed perpendicularly with respect to the first board, and disposed on at least two outer surfaces of the box.

2. The base station of claim 1, wherein the box comprises: first and second outer surfaces which face each other; and third and fourth outer surfaces disposed between the first and second outer surfaces while facing each other,
   wherein at least three inner walls are provided inside a surface of the box on which the antenna is installed.

3. The base station of claim 2, wherein the board comprises:
   second and third boards disposed in parallel to the first and second outer surfaces to face the first and second outer surfaces, respectively; and
   a fourth board disposed in parallel to the third outer surface while facing the third outer surface.

4. The base station of claim 3, wherein the first board is a digital interface module, the second and third boards are first and second power amplifiers, and the fourth board is an up/down converter.

5. The base station of claim 3, wherein the power supply unit is disposed on the fourth outer surface, and is disposed to be perpendicular to the first board.

6. The base station of claim 2, wherein the antenna unit comprises an antenna, an antenna transmission/reception module stacked on the antenna.

7. The base station of claim 6, wherein the inner wall acts as a reflective plate of the antenna unit.

8. The base station of claim 1, wherein the box is a filter unit.

9. The base station of claim 8, wherein the filter unit has at least two filters coupled to face each other.

10. The base station of claim 3, wherein the first to fourth boards and the power supply unit are disposed to surround all the outer surfaces of the box.

11. The base station of claim 4, wherein the first to fourth boards and the power supply unit are disposed to surround all the outer surfaces of the box.

12. The base station of claim 5, wherein the first to fourth boards and the power supply unit are disposed to surround all the outer surfaces of the box.

13. A base station of a mobile communication system, comprising:
   a polyhedral box;
   an antenna unit installed on the widest of outer surfaces of the box;
   a first board disposed on one of the outer surfaces of the box; and at least two boards disposed in an upright position from the first board, and disposed to face at least two outer surfaces of the box, wherein the box includes:
  first and second outer surfaces which face each other; and
  third and fourth outer surfaces disposed between the first and second outer surfaces while facing each other, and at least three inner walls are provided inside a surface of the box on which the antenna is installed.

\* \* \* \* \*